UNITED STATES PATENT OFFICE.

HARRY WILLIAMS CHARLTON, OF JONES POINT, NEW YORK, ASSIGNOR TO AMERICAN POTASH CORPORATION, A CORPORATION OF VIRGINIA.

PROCESS OF PRODUCING ALKALI-METAL HYDRATES.

1,346,002. Specification of Letters Patent. Patented July 6, 1920.

No Drawing. Application filed October 12, 1916. Serial No. 125,164.

*To all whom it may concern:*

Be it known that I, HARRY WILLIAMS CHARLTON, a citizen of Canada, residing at Jones Point, in the county of Rockland, in the State of New York, have invented new and useful Improvements in Processes of Producing Alkali-Metal Hydrates, of which the following is a specification.

This invention relates to a simple and economical method of recovering potash from feldspar, lucite, mica, etc., and at the same time obtaining a useful by-product which very materially lessens the cost of the potash recovery.

The process consists essentially in subjecting finely ground feldspar, etc., to the action of a solution of either sodium or potassium hydrates, or mixtures of these, in presence of milk of lime in an autoclave, at a temperature above 160° C. and at a corresponding pressure; but I prefer to employ a temperature above that corresponding to a pressure of 200 pounds to the square inch, for in this latter case, the resulting by-products of the digestion are found to be more valuable for use as a cementing material than is the case when lower temperatures and pressures are employed.

The alkali metal hydrates added, in all cases would tend to decompose the rock material even if no lime were employed. On the other hand, the lime added is of a sufficient quantity to decompose said rock material after a certain period of time, even if no alkali metal compound is employed. It therefore follows that when both alkali metal and alkali earth metal hydrates are employed the decomposition of the rock material is accomplished in a less time or is more thorough than when either reagent alone is used.

Further, it is desired to obtain the alkali metal hydrates free from impurities such as silica, alumina, etc., and the presence of a reagent such as lime serves to precipitate these said impurities as fast as they appear in the solution.

In carrying out this invention, I preferably employ from say 40 to 60 parts of an alkali earth metal compound such as lime, and I add to this from say 60 to 40 parts of finely divided feldspar. The amount of alkali metal compounds employed will depend largely upon the nature of the rock material, and I find it can vary from a fraction of a per cent. up to say 15%. It however, is an observed fact that when only a fraction of a per cent. is employed, and when substantially as much as 15% is employed, the alkali metal in the rock will be converted into such a state that a large percentage of the same may be recovered, either in the solution or by a thorough washing of the insoluble residues. On the other hand, if from say 2% to 10% of alkali metal compounds are added to the mixture then the percentage of the alkali metals recovered from the rock is greatly reduced, as they appear in such cases to again form insoluble compounds.

When the pressure exceeds 200 pounds to the square inch I find that a large percentage of the potash present in the rock may be recovered and a valuable cementing material formed in from two to four hours.

At the completion of the reaction in the autoclave the steam is allowed to escape into the liquid in the mixing vessel nearby and is there condensed. In this manner any potash mechanically carried over by the steam is recovered. When the pressure in the autoclave has been lowered sufficiently, the charge is run out and filtered. The filtrate containing the bulk of the alkali metals is next evaporated and the alkali metals separated in any way desired. The solids are washed and the wash water employed in making up solutions for later digestions.

One of the most important features of the complete process is the utilization of the insoluble residue, which contains hydrous calcium aluminum silicate. This material possesses very unusual properties and is capable of exerting a cementing and binding action on inert, inorganic material mixed with it, when the mass is compressed and steamed under pressure. With silica, or sand, it is used in making brick.

It is obvious that those skilled in the art may vary the details of the process without departing from the spirit of the invention, and therefore, I do not wish to be limited to the above disclosure except as may be required by the claims.

What I claim is:—

1. The process of producing an alkali metal hydrate from rock material containing an alkali metal which consists in heating and digesting said rock material with a reagent containing an alkali metal hydrate mixed with a reagent containing an alkali earth metal hydrate at a pressure and for a time sufficient to produce the desired alkali metal hydrate and suitably recovering said last named hydrate, substantially as described.

2. The process of producing sodium and potassium hydrates from feldspar which consists in heating and digesting said feldspar with a mixture of calcium and alkali metal hydrates at a temperature and pressure and for a time sufficient to produce said alkali metal hydrates; and suitably recovering said last named hydrates, substantially as described.

3. The process of producing alkali metal hydrates and a cementing material which consists in heating and digesting feldspar with a mixture of calcium and alkali metal hydrates at a pressure and for a time sufficient to produce the desired alkali metal hydrates and cementing material, and suitably separating said products from each other, substantially as described.

4. The process of making soluble alkali-metal compounds from insoluble alkali-metal-containing substances, which comprises exposing such substance to the combined action of water, containing an alkali-metal hydroxid and an oxy-compound of metal exothermic when acted upon by water, having greater affinity than the alkali-metal therein for the non-metal combined therewith.

5. The process of making soluble alkali-metal compounds from insoluble alkali-metal-containing substances, which comprises exposing such substance to the combined action of water, containing an alkali-metal hydroxid and an oxy-compound of metal exothermic when acted upon by water, having greater affinity than the alkali-metal therein for the non-metal combined therewith, while under super-atmospheric pressure.

6. The process of making soluble alkali-metal compounds from insoluble alkali-metal-containing substances, which comprises exposing such substance to the combined action of an alkali-metal hydroxid, steam, and an oxy-compound of metal having greater affinity than the alkali-metal therein, for the non-metal combined therewith, while heating the same under super-atmospheric pressure.

7. The process of making soluble alkali-metal compounds from insoluble alkali-metal-containing substances, which comprises exposing such substance to the combined action of an alkali-metal-hydroxid, steam, and an oxy-compound of metal exothermic when acted upon by water, having greater affinity than the alkali-metal therein, for the non-metal combined therewith, while under super-atmospheric pressure.

8. The process of making soluble alkali-metal compounds from insoluble alkali-metal-containing substances, which comprises exposing such substance to the combined action of water, containing an alkali metal hydroxid, and calcium oxid.

9. The process of making soluble alkali-metal compounds from insoluble alkali-metal-containing substances, which comprises exposing such substance to the combined action of water, containing an alkali-metal hydroxid, and calcium oxid, while under super-atmospheric pressure.

10. The process of making soluble alkali-metal compounds from insoluble alkali-metal containing substances, which comprises exposing such substance to the combined action of an alkali-metal hydroxid, steam, and calcium oxid.

11. The process of making soluble alkali-metal compounds from insoluble alkali-metal-containing substances, which comprises exposing such substance to the combined action of an alkali-metal hydroxid, steam, and calcium oxid, while under super-atmospheric pressure.

12. The process of making soluble potassium compounds from insoluble potassium-containing silicates, which comprises exposing such silicate to the combined action of potassium hydroxid, steam, and calcium oxid.

13. The process of recovering potassium hydrate from potassium bearing silicates which consists in finely dividing said silicates; mixing therewith calcium oxid and potassium hydrate to later effect a double decomposition of said minerals; subjecting the mixture to the action of an autoclave at a temperature sufficient to bring about the reaction and suitably recovering the potassium hydrate thus produced, substantially as described.

HARRY WILLIAMS CHARLTON.

Witnesses:
WARREN H. POST,
HARRY B. FINNEGAN.